(12) United States Patent
Vinn

(10) Patent No.: US 7,307,614 B2
(45) Date of Patent: Dec. 11, 2007

(54) LIGHT EMITTING DIODE DRIVER CIRCUIT

(75) Inventor: Charles Vinn, Milpitas, CA (US)

(73) Assignee: Micrel Inc., San Jose, CA (US)

( * ) Notice: Subject to any disclaimer, the term of this patent is extended or adjusted under 35 U.S.C. 154(b) by 656 days.

(21) Appl. No.: 10/835,211

(22) Filed: Apr. 29, 2004

(65) Prior Publication Data
US 2005/0243041 A1 Nov. 3, 2005

(51) Int. Cl.
*G09G 3/32* (2006.01)
*G09G 3/36* (2006.01)

(52) U.S. Cl. .......................... 345/102; 345/30; 345/55; 345/76; 345/82; 345/87; 315/165 R; 315/194; 315/216; 315/291

(58) Field of Classification Search .................. 345/30, 345/39, 44, 46, 55, 76, 82, 83, 84, 90, 91, 345/102
See application file for complete search history.

(56) References Cited

U.S. PATENT DOCUMENTS

| 4,350,905 | A |   | 9/1982  | Sato |   |
|-----------|---|---|---------|------|---|
| 5,633,612 | A |   | 5/1997  | Lee  |   |
| 5,739,639 | A | * | 4/1998  | Johnson | 315/86 |
| 6,359,392 | B1|   | 3/2002  | He   |   |
| 6,586,890 | B2|   | 7/2003  | Min et al. |   |
| 6,621,235 | B2| * | 9/2003  | Chang | 315/216 |
| 6,628,252 | B2|   | 9/2003  | Hoshino et al. |   |
| 6,788,033 | B2| * | 9/2004  | Vinciarelli | 323/225 |
| 6,864,641 | B2| * | 3/2005  | Dygert | 315/216 |
| 7,148,632 | B2| * | 12/2006 | Berman et al. | 315/189 |

* cited by examiner

*Primary Examiner*—Richard Hjerpe
*Assistant Examiner*—My-Chau T. Tran
(74) *Attorney, Agent, or Firm*—Ladas & Parry LLP

(57) ABSTRACT

Describe is a device for a multiplexing, output current-sensed, boost converter circuit which may be used as an LED driver. A boost converter LED driver circuit using a single set of passive external LC components for controlling the current through, and thus the output of, one and more than one bank of LEDs. The present invention allows for regulated current in one and more than one bank of LEDs by sensing current in the controller. The output voltage of a switcher adjusts it's level automatically until the current to the LEDs is set to the desired LED threshold requirement.

4 Claims, 2 Drawing Sheets

LIGHT EMITTING DIODE DRIVER CIRCUIT

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO AN APPENDIX

Not applicable.

BACKGROUND

1. Technical Field

The technology described herein is generally related to the field of integrated circuits and, more particularly, to driver circuits for light emitting diode ("LED") chains.

2. Description of Related Art

LEDs are known act as a source of emitted light for a wide variety of applications. LEDs are known to provide many advantages over incandescent and fluorescent illumination because of their long operating life, high efficiency, light weight, and low profile. LED light output is proportional to current therethrough. Problems can be particularly egregious for portable devices where battery output gradually decreases with time of use. Therefore, an LED driver circuit is needed that is relatively immune to small voltage fluctuations.

Moreover, white light LEDs are particularly convenient for applications such as backlighting liquid crystal display ("LCD") screens. The LEDs are often configured as a set of serial connected LEDs, sometimes referred to in the art and hereinafter as "LED chains," "LED sets," "LED banks," or the like. Lightweight, battery-powered devices, such as mobile computing and communications devices—e.g., personal digital assistant, cellular telephone, electronic book, and the like—may use LEDs as a back light or side light. It is important to provide LED driver circuitry in which a constant current is provided to each LED to provide adequate lighting and to minimize flickering on the screen.

Furthermore, it is known that white light LEDs have relatively high threshold voltages for turn on, sometimes higher than the battery nominal output voltage. Therefore, DC-to-DC power supply booster circuits may be employed. U.S. Pat. No. 6,628,252 (Hoshino et al.) shows a known manner LED DRIVE CIRCUIT. A booster circuit is provided for boosting battery output voltage, describing a means for generating a constant current to an LED. U.S. Pat. No. 6,586,890 (Min et al.) shows a known manner LED DRIVER CIRCUIT WITH PWM OUTPUT. U.S. Pat. No. 6,359,392 (He) describes a HIGH EFFICIENCY LED DRIVER. Basically, these LED driver circuits generate a LED drive potential by boosting a battery voltage.

FIG. 1 (PRIOR ART) is a schematic diagram illustrating a passive inductor, "$L_{EXT}$," passive discharge capacitor "$C_{EXT}$," type DC-DC boost converter 101—used in commercial products such as the Model 2287 integrated circuit manufactured by the assignee herein—for driving a chain 102 of white LEDs 103-1, 103-2, 103-N using a pulse width modulator ("PWM") 108 technique, wherein current feedback substantially constantly adjusts the power to the LED chain (see also, e.g., Min et al., incorporated herein by reference). The voltage level at the output node 104 connected to the LED chain 102 is established by a reference voltage "$V_{REF}$" applied to one terminal, node 107, of a comparator operational amplifier 105, also sometimes referred to in the art as the "error amplifier," having an appropriately sized resistor "$R_{EXT}$" 106, with the LED chain 102 connected to the other terminal of the amplifier. The output voltage at node 104 adjusts until the loop through the 101 controls the current in the LED chain 102 such that the current there through is defined as, $$I = V_{REF}/R_{EXT},$$

where $V_{REF}$ is a regulated voltage powered from $V_{IN}$.

However, with such a scheme, in a device having a plurality of sets of LEDs, each chain would require a separate such booster circuit 101. Power efficiency—battery life—is reduced by each booster circuit employed. This also is cost inefficient.

BRIEF SUMMARY

The present invention generally provides for a multiplexing, output current-sensed, boost converter circuit which may be used as an LED driver for multiple LED chains.

The foregoing summary is not intended to be inclusive of all aspects, objects, advantages and features of the present invention nor should any limitation on the scope of the invention be implied therefrom. This Brief Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

Like reference designations represent like features throughout the drawings. The drawings in this specification should be understood as not being drawn to scale unless specifically annotated as such.

DETAILED DESCRIPTION

Figure 1:
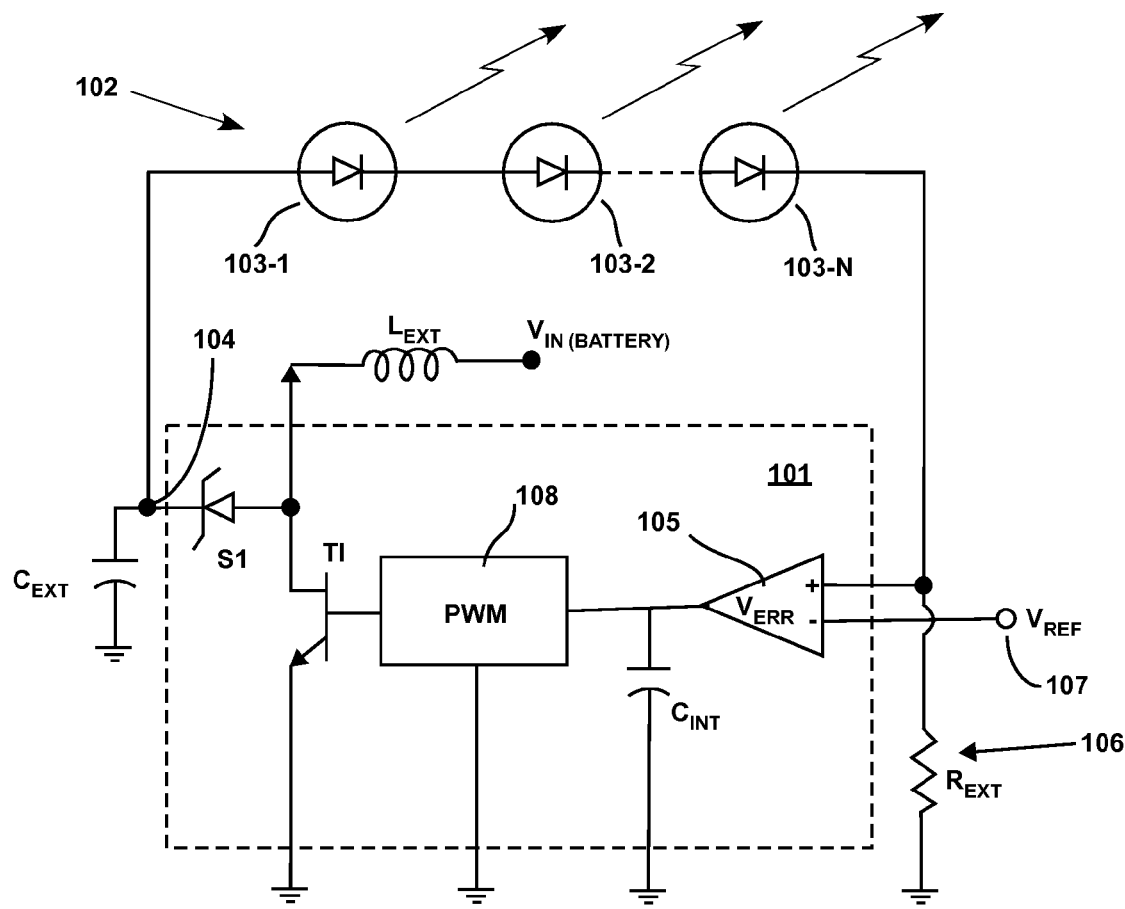
FIG. 1 (Prior Art) is an electrical schematic diagram for an LED boost converter.

The present invention provides for a boost converter LED driver circuit using a single set of passive external LC components for controlling the current through, and thus the output of, one and more than one bank of LEDs. The present invention allows for regulated current in one and more than one bank of LEDs by sensing the voltage drop across a MOSFET operating in the linear region in the controller rather than sensing voltage across a resistor as in accordance with the conventional wisdom (e.g., as illustrated by FIG. 1 (Prior Art) described in the Background section hereinabove). In general, the output voltage of a switcher adjusts it's level automatically until the current to the LEDs is set to the desired LED threshold potential. An exemplary embodiment is described for a single switch-mode regulator using a single set of external passive elements which allows an OR or AND function for two banks of white LEDs. It will be recognized by those skilled in the art that the methodology can be extended to a plurality of banks of LEDs of a variety of commercially available types and sizes.

Figure 2:
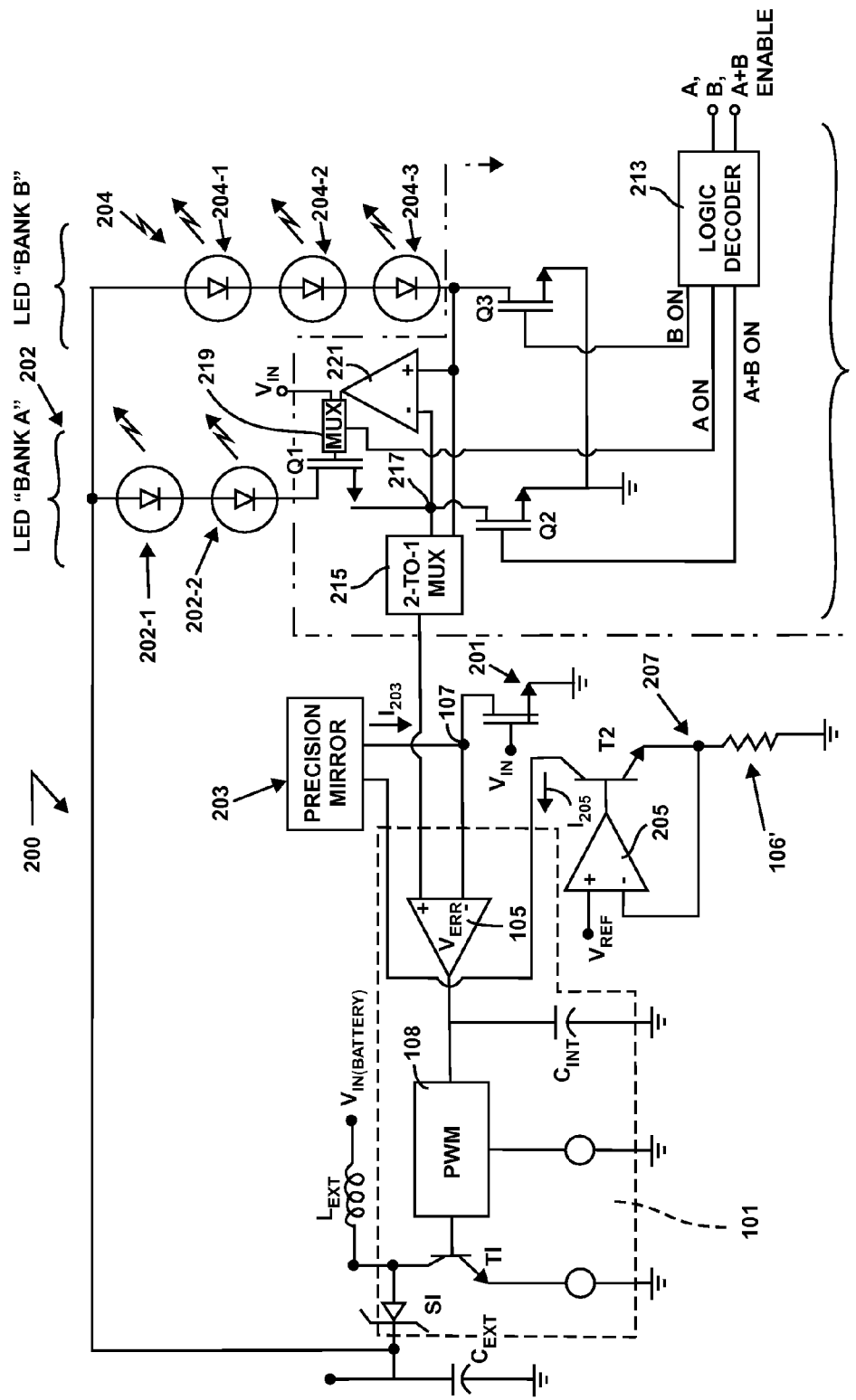
FIG. 2 is an electrical schematic diagram in accordance with an exemplary embodiment of the present invention for driving one or more sets of LED chains.

FIG. 2 is an electrical schematic diagram in accordance with an exemplary embodiment of the present invention. The core of this dual LED bank circuit 200 may be the external inductor, "$L_{EXT}$," and discharge capacitor "$C_{EXT}$," type DC-DC boost converter 101 as shown in FIG. 1 (Prior Art).

A first modification to the boost converter 101 is to decouple one input, connected to the node 107, of the $V_{ERR}$ operational amplifier 105 from the reference voltage, $V_{REF}$. An LED driver-stage transistor 201—shown as an exemplary n-channel metal oxide semiconductor field effect transistor (MOSFET)—will used to determine the current for the LED banks 202, 204. This driver-stage MOSFET 201 has a gate connected to the input power supply, $V_{IN}$, a drain connected to node 107, and a source connected to a reference potential, e.g., electrical ground as shown. Via node 107, the drain is connected to a current source dependent on $V_{REF}$ and $R_{EXT}$ 106'. Further details regarding this MOSFET 201 will be explained below.

A second modification is to provide a precision current mirror circuit 203—well known in the art and represented here in block diagram form; see e.g., U.S. Pat. No. 5,633,612 (Lee), incorporated herein by reference—having an output also connected to node 107 which is connected to the inverting input of the $V_{ERR}$ operational amplifier 105 and the drain of the driver-stage MOSFET 201. Node 107 is thus a summing junction. The input current to the precision mirror circuit 203 is $I_{205}$ from the output of an added driver-stage operational amplifier 205. A non-inverting input to this operational amplifier 205 is connected to $V_{REF}$. The inverting input to this operational amplifier is connected via a feedback loop from a transistor T2. In this embodiment, transistor T2 is a bipolar transistor having its base connected to the output of the operational amplifier 205, its collector connected to the input of the precision mirror circuit 203, and its emitter connected to a node 207 leading to the inverting input to the operational amplifier and to a programmer resistor 106, $R_{EXT}$. The resistor 106' connects node 207 to the ground reference potential. This resistor 106' is now referred to as the "programmer resistor" because its size selection can be adjusted to work with the driver-stage MOSFET 201 to program the booster circuit 201 to the appropriate threshold voltages of the requirements of the LEDs 202-1, 202-2 in LED BANK A 202 and LEDs 204-1, 204-2, 204-3 in LED BANK B 204.

MOSFET 201 is scalable. As described in the Background section for the embodiment of FIG. 1 (Prior Art), the output voltage of an LED driver switcher adjusts its level until the current is controlled to the desired level established by the reference voltage applied to the input of the error amplifier 105 and the external resistor 106 tied to the LED bank 102 on the other input to the error amplifier. But now, comparing to FIG. 1 (Prior Art) to the exemplary embodiment of the present invention shown in FIG. 2, rather than connecting a reference voltage $V_{REF}$ directly to the input of the operational amplifier 105, node 107, the voltage at node 107 is defined by the switcher circuitry in accordance with the present invention as:

$$V_{107} = I_{203} \cdot Rdson,$$

where $I_{203} = f(V_{REF}, R_{EXT}, I_{205})$, and Rdson is ratio-metric to the size of the driver stage MOSFET 201. In other words, there is a current $I_{203}$ out of the precision mirror 203 which will be a function of the output of operational amplifier 205 via transistor T2, $I_{205} = V_{REF}/R_{EXT}$, which is then mirrored as current $I_{203}$. MOSFET 201 is turned ON and is in the linear region, so that it effectively acts as a resistor with a resistance defined as Rdson which is a function of the physical size of the MOSFET, "$area_A$," i.e., it is ratio-metric. In effect, the bandgap voltage of the driver stage MOSFET 201 will now control the current to the boost circuit 101 via node 107. The decoder stage circuitry, FIG. 2, region 211—described in more detail immediately hereinafter—employs decoder stage output MOSFETs Q1, Q2, Q3 (again, exemplary n-channel devices) which each have an area defined as "$n \cdot area_A$" which in turn also means they will be able to carry a current "$n \cdot I_{203}$."

A logic decoder—well known in the art (see e.g., U.S. Pat. No. 4,350,905, incorporated by reference) and therefore shown as block 213, labeled "LOGIC DECODER"—receives signals indicative of which bank of LEDs has been selected. For example, logic signal "A ENABLE" (e.g., output from user panel circuitry not shown) may signify "select BANK A 202," logic signal "B ENABLE" may signify "select BANK B 204", and logic signal "A+B ENABLE" may signify "select both banks 202, 204." Additionally, an OFF state is available where neither bank is enabled. The logic decoder 213 thus determines whether one LED bank 202, 204, or both is enabled, and which functions of a multiplexer circuit—also well known in the art and therefore shown as block 215, labeled "2-TO-1 MUX"—are selected. The multiplexer 215 output is electrically connected to the error amplifier 105 non-inverting input.

A first MOSFET Q1 has a drain connected to the LED BANK A 202, a source connected to a summing junction node 217, and a gate connected to $V_{IN(BATTERY)}$ via another multiplexer 219. This multiplexer 219, which is also connected to the appropriate output of LOGIC DECODER 213, selects either $V_{IN}$ or the output of the 2-to-1 MUX 215 via OP AMP 221. Summing junction node 217 is electrically connected also to a first input to the multiplexer 215. A first decoder output MOSFET Q2 has a drain connected to node 217, a grounded source, and a gate connected to an appropriate output of the LOGIC DECODER 213 associated with selecting LED BANK A 202 and both banks. A second decoder output MOSFET Q3 has a drain connected to the LED BANK B 204 and to a second input of the multiplexer 215, and a gate connected to the appropriate output of the LOGIC DECODER 213. Both the summing junction 217 and the drain region of MOSFET Q3 are connected to the non-inverting input of a decoder feedback loop operational amplifier 221; the inverting input of this operational amplifier is connected to summing junction node 217; the output of this operational amplifier is connected to the multiplexer 219. The respective source regions of MOSFETS Q2 and Q3 are co-connected to ground.

When only LED BANK A 202 is to be ON, the gate of MOSFET Q1 is connected to $V_{IN}$. This makes MOSFET Q1 appear to be a resistor; MOSFET Q2 establishes the current for the LED bank. To have both LED BANK A 202 and LED BANK B 204 ON, the OP AMP 221 output is selected, the drain of MOSFET Q3 is connected to the error OP AMP 105 via the 2-to-1 MUX 215, and the gate of MOSFET Q1 is controlled through the OP AMP 221 to regulate the currents in the two LED banks. Using the same voltage $V_{IN}$ at the multiplexer 219 with the decoder circuitry output MOSFET Q1 as with the gate of the error operational amplifier MOSFET 201 and with the scaling of the decoder MOSFETS Q1, Q2, Q3 with respect thereto, the current to the LEDs will scale directly.

LED BANK A 202 may be selected—e.g., A ENABLE only—by enabling exemplary n-channel MOSFET Q2, turning ON transistor Q1, and selecting the appropriate multiplexer 215 function for turning BANK A 202.

LED BANK B—which is the bank with the largest number of white LEDs in this exemplary embodiment, thus requiring the greatest voltage—may be selected—e.g., B ENABLE only—by turning ON exemplary p-channel MOSFET Q3 and selecting an alternate multiplexer 215 function.

Both LED BANK A 202 and LED BANK B 204 may also be selected, e.g., A+B ENABLE signal. In this mode, the 2-TO-1 MUX 215 selects LED BANK B 204; MOSFET Q2 is ON; the drain voltage of MOSFET Q2 is compared to the drain voltage of MOSFET Q3 and is controlled by the decoder feedback loop operational amplifier 221 forced to be the same voltage as drain voltage of MOSFET Q3. The gate voltage of MOSFET Q1 is raised or lowered until the drain-source voltage, Vds, allows the currents through the two LED banks 202, 204 to be equal, established by matching MOSFETs Q1, Q2, Q3 with respect to "n·area$_A$" as described hereinbefore. The summing junction nodes 107, 217 are effectively driven to the same voltage. Therefore, the current through the banks of LEDs is regulated to whatever the resistor 106', R$_{EXT}$, is "programming" it to be as described hereinabove.

The present invention provides a single switch, multi-mode LED current driver, using a single set of external passive elements, which allows both an OR and AND function for two banks of white LEDs. It will be recognized by those skilled in the art that the concept can be extended to a plurality of banks of LEDs. Variations in the Rdson due to fabrication process and operating temperature do not matter because they will be common to both sides of the error amplifier 105. While the exemplary embodiment(s) described herein is illustrative of using semiconductor devices having a specific transistor polarity implementation, it will be recognized by those skilled in the art that an implementation of reverse polarity devices can be made. No limitation on the scope of the invention is intended by the exemplary embodiment(s) and none should be implied therefrom.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . . "

What is claimed is:

1. A light emitting diode (LED) driver boost converter system having a primary power source voltage and reference source voltage and comprising:

pulse width modulating (PWM) means for electrically driving one or more chains of multiple chains of LEDs, said PWM means employing a first differential amplifier input having a first input connected to said decoding means and a second input, wherein said regulating means is connected to a second input of said differential amplifier and further comprises means for generating a reference current; and connected to said chains and said PWM means, decoding means for decoding logic signals representative of selecting one or more of said multiple chains; and connected to said PWM means and said decoding means, regulating means connected to a second input of said differential amplifier for regulating a reference current such that PWM output voltage for driving said chains of LEDs is automatically adjusted until current to the one or more of said multiple chains of LEDs selected is set to a desired threshold;

said regulating means including means for generating a reference current, said means for generating said reference current comprising:

a reference resistor;

a second differential amplifier, having a first input connected to the reference voltage source, a second input for receiving a feedback signal, and an output;

a first transistor having an input connected to the output of said second differential amplifier, a first output terminal connect to said second input of said second differential amplifier and to the second reference voltage source via said reference resistor, and a second output terminal;

a precision current mirror, having an input and an output, wherein said input of said mirror is connected to said second output terminal of said first transistor and said output of said mirror is connected to said second input of said first differential amplifier; and a second transistor, having an input connected to said primary power source voltage, a first output terminal connected to a secondary potential voltage level, and a second output terminal connected to connected to said second input of said first differential amplifier such that said reference current is determined by the physical size of said second transistor.

2. The system as set forth in claim 1, wherein said bias resistor has a resistance value selected for matching said reference current to said desired threshold.

3. The system as set forth in claim 1, said regulating means further comprising:

a metal oxide semiconductor field effect transistor (MOSFET) wherein voltage drop across said MOSFET in linear region operation regulates current in one or more of said chains selected by said decoding means.

4. A system for driving a plurality of light emitting diode (LED) banks, said system having a primary power source voltage and reference source voltage, the system comprising:

a boost converter using a passive capacitor-inductor set for driving LED light emission;

connected to said boost converter, a controller for regulating current to one and more than one of said plurality of LED banks, said controller including a metal oxide semiconductor field effect transistor (MOSFET), wherein a reference level is established by turning on the MOSFET into a linear region having an effective resistance which is ratio-metric to MOSFET devices for supplying current to said banks and providing a reference voltage drop thereacross for establishing regulated electrical current to each of said plurality of LED banks; and a logic decoder having inputs for receiving bank selection signals and outputs connected to said at least two LED chains via said MOSFET devices;

said controller connecting said decoder to said boost converter and said controller further including:

a reference resistor;

a second differential amplifier, having a first input connected to the reference voltage source, a second input for receiving a feedback signal, and an output;

a first transistor having an input connected to the output of said second differential amplifier, a first output terminal connect to said second input of said second differential amplifier and to the second reference voltage source via said reference resistor, and a second output terminal;

a precision current mirror, having an input and an output, wherein said input of said mirror is connected to said second output terminal of said first transistor and said output of said mirror is connected to said second input of said first differential amplifier; and a second transistor, having an input connected to said primary power source voltage, a first output terminal connected to a secondary potential voltage level, and a second output terminal connected to connected to said second input of said first differential amplifier such that said reference current is determined by the physical size of said second transistor.

* * * * *